United States Patent [19]
Young

[11] 4,094,300
[45] June 13, 1978

[54] SOLAR HEAT COLLECTOR

[76] Inventor: Sam W. Young, 1305 White Rd., Opelika, Ala. 36801

[21] Appl. No.: 697,917

[22] Filed: Jun. 21, 1976

[51] Int. Cl.² .............................................. F24J 3/02
[52] U.S. Cl. ..................................... 126/271; 138/38; 29/157 R; 220/4 D; 220/1 BC
[58] Field of Search ............... 126/270, 271; 237/1 A; 220/4 C, 4 D, 1 BC; 113/120 N, 120 BB; 138/37, 38, 40; 165/170, 145; 29/157 R

[56] References Cited

U.S. PATENT DOCUMENTS

| | | | |
|---|---|---|---|
| 695,136 | 3/1902 | Baker | 126/271 |
| 2,680,437 | 6/1954 | Miller | 126/270 |
| 3,705,622 | 12/1972 | Schwarz | 165/145 |
| 3,961,619 | 6/1976 | Estes et al. | 126/271 |
| 3,976,508 | 8/1976 | Mlavsky | 126/270 |
| 3,996,918 | 12/1976 | Quick | 136/270 |
| 4,036,207 | 7/1977 | Bouse | 126/271 |

Primary Examiner—Kenneth W. Sprague
Assistant Examiner—James C. Yeung
Attorney, Agent, or Firm—Newton, Hopkins & Ormsby

[57] ABSTRACT

A solar heat collector having a collector element made from interconnected tubular members, each of which is provided with a transverse baffle, the baffles have openings forming spillways over which heat exchanging liquid passes. The collector element is preferably made from a plurality of tandem arranged sheet metal soft drink or beer cans, the ends of certain cans being removed before the cans are assembled. One or a plurality of collector elements are disposed along an incline such as a roof and a pump feeds liquid to the upper end or ends of the inclined collector element or elements to cascade down through each element and be heated by heat absorbed into the metal from the sun's rays. The heated liquid is then fed through a pipe or pipes from the lower end of each collector.

7 Claims, 3 Drawing Figures

U.S.Patent  June 13, 1978  4,094,300

SOLAR HEAT COLLECTOR

BACKGROUND OF THE INVENTION

1. Field of the Invention

This invention relates to a solar heat collector and is more particularly concerned with a solar heat collector which is suitable for mounting on the roof of a building and heating liquids.

2. Description of the Prior Art

In the past, numerous solar heat collectors have been made through which liquid is passed in order to collect the heat from the rays of the sun. Usually such prior art devices have been quite expensive and have been relatively inefficient.

The present invention provides a very inexpensive solar heat collector which is formed from scrap materials and affords a relatively efficient form of solar heat collection.

SUMMARY OF THE INVENTION

Briefly described, the present invention includes a collector element formed by a plurality of juxtaposed metal tubular members. These tubular members are preferably beer cans which have been opened so as to provide a passageway through the top of each beer can. The lower portions of most of the beer cans have been removed to provide an open bottom which is connected in tandem to the top rim of the next adjacent beer can. One end member of the solar heat collector element is formed of a can in which the upper end of the cans have been removed. The other end member is simply an opened beer can. The solar collector element is disposed at an angle on the roof of an existing building and liquid, such as water, is supplied by a pump to the upper end of the solar collector element, the heated liquid being discharged from the lower end of the collector through a pipe to an appropriate appliance, such as a water heater.

DESCRIPTION OF THE PREFERRED EMBODIMENT

Figure 1:
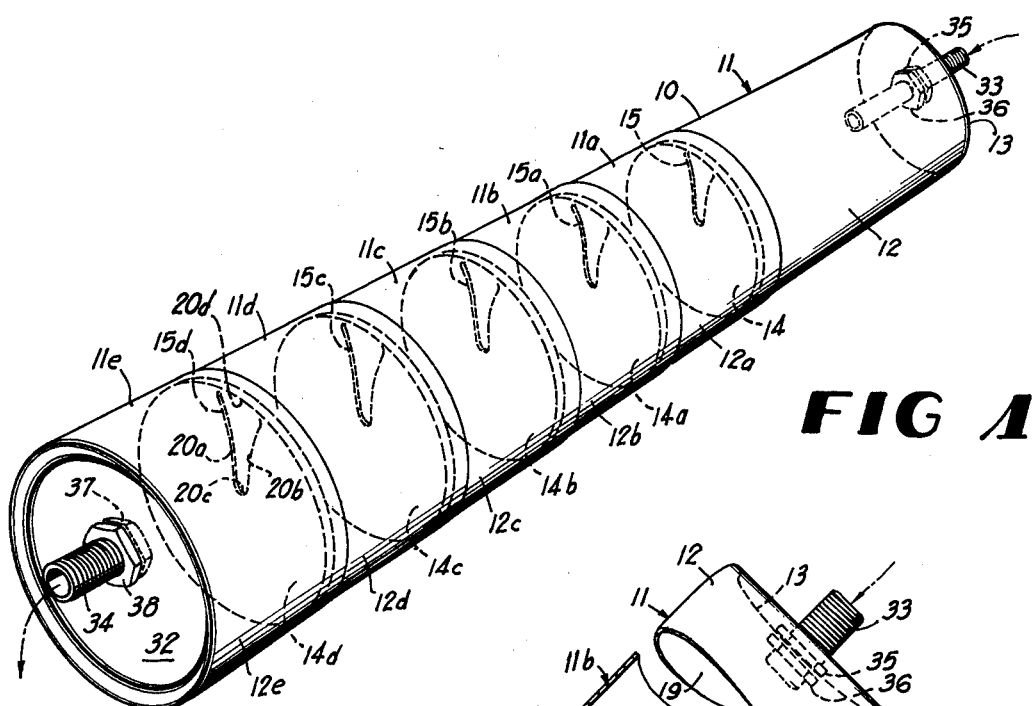
FIG. 1 is a perspective view of a solar heat collector element constructed in accordance with the present invention, the baffles of the heat collector element being shown in broken lines.
Figure 2:
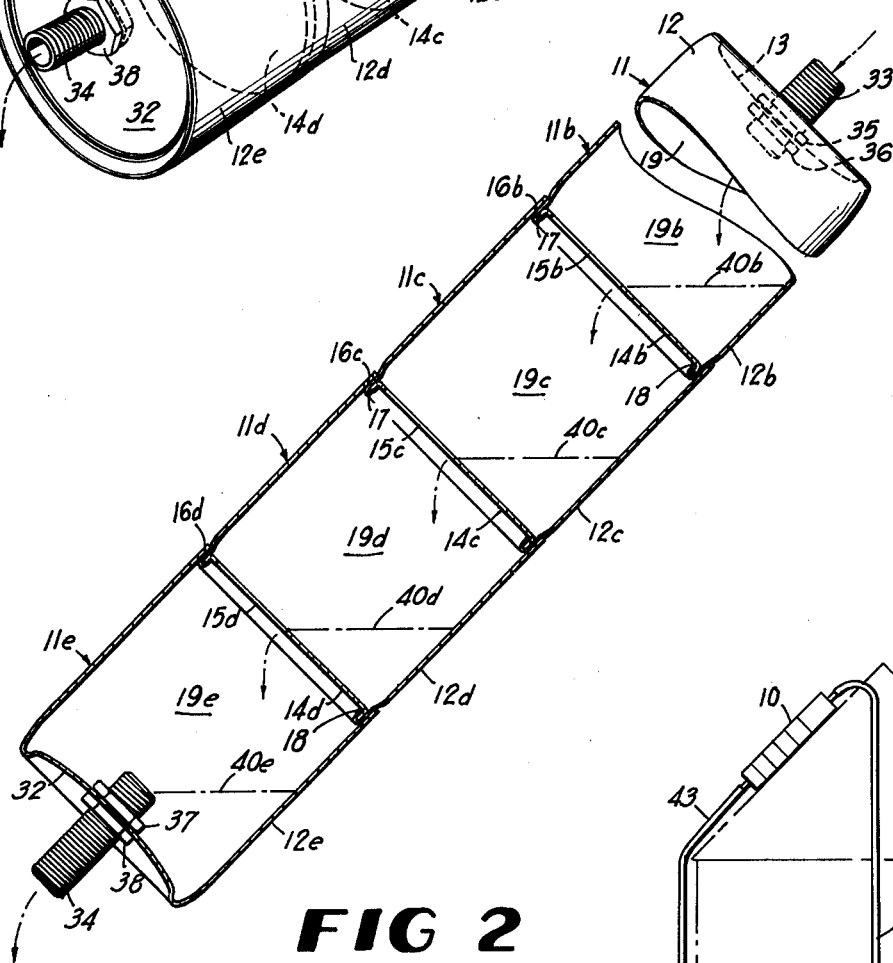
FIG. 2 is a fragmentary, partially broken away, side elevational view of the solar heat collector element disclosed in FIG. 1.

Referring now in detail to the embodiment chosen for the purpose of illustrating the present invention, numeral 10 denotes generally the solar heat collector element of the present invention. This solar heat collector element consists of a tubular body formed from a plurality of overlapping sheet metal tubular members 11, 11a, 11b, 11c, 11d and 11e arranged in tandem, the first or uppermost tubular member 11 consisting of an open, empty, aluminum beer can or soft drink can. The member 11 includes a tubular cylindrical body portion 12 and a concaved bottom 13 extending across one end of the body portion 12. The concaved bottom 13 is integrally formed with the cylindrical body portion 12, usually by impact extrusion. The beer can 11 has a top 14 which has a generally V-shaped opening 15 of the type normally formed when the beer can 11 is opened and the tab (not shown) thereof discarded.

The peripheral end portion of the body portion 12 is of reduced diameter to provide a peripheral flange, such as flange 16b of member 11b. Flange 16b is rolled inwardly to form a reversely bent, inwardly extending lip 17 which receives the annular flange 18 of the top cap or baffle 14b.

According to the present invention, tubular member 11a is produced by cutting off along a radial cut the bottom portion of the beer can so as to provide a right cylindrical metal body portion 12a which is open along its bottom portion, the body portion 12a being wholly cylindrical substantially throughout its length, but being of reduced diameter at its top edge to provide peripheral flange 16a so as to receive and retain the top or cap or baffle 14a in the manner previously described for top or cap 14. The top or cap or baffle 14a is provided with an opening 15a which is aligned axially, as shown in FIG. 1, with the next preceding opening 15. The bottom end portion of the body 12a overlaps and is received on the end portion or flange 16 of body portion 12. The bottom edge portion of body portion 12a is secured in place on and overlapping the flange 16 by friction, being press fitted together, or, if desired, by means of adhesive, solder, braising or the like, so as to provide a watertight seal between the compartments 19 and 19a of the respective juxtaposed beer cans or containers.

A succession of additional beer cans or containers with their ends removed, similar to member 11a, are provided, being stacked or secured in tandem with each other and with the member 11a at one end to form additional tubular members being designated respectively by the numerals 11b, 11c and 11d. Of course, it will be understood by those skilled in the art that as many additional containers or cans, with their ends cut off, as desired may be arranged in tandem so as to provide a solar heat collector element as long as is practical. Each of the containers in succession has an opened cap so that a plurality of radially extending, axially spaced, parallel baffles 14b, 14c and 14d are formed by these caps. Each of these caps or baffles 14b, 14c, 14d has an opening similar to opening 15, the openings being respectively designated by the numerals 15b, 15c and 15d. The openings 15, 15a, 15b, 15c and 15d are each identical and are in alignment axially along the length of the collector element. Each of the openings 15, 15a, 15b, 15c and 15d is defined by inwardly tapered, opposed sides edges 20a and 20b, the inner end portions of which are joined by a U-shaped inner edge 20c. The divergent outer end portions of edges 20a and 20b are joined by an arcuate outer edge 20d. The inner concaved edge 20c is adjacent to the center of the baffle, such as baffle 14d.

The lower end portion of the solar heat collector element 10 is provided with a lower tubular member 11e formed by a beer can, the top end portion of which has been removed by a radial cut. Thus, the member 11e has a right cylindrical body portion 12e and a concaved lower end or bottom 32 which is integrally formed with the body portion 12e, the end or bottom 32 closing the lower portion of the hollow tubular body portion 12e.

The upper end portion of the body portion 12e overlaps and is joined to the lower end portion or flange 16d of the last cylindrical body portion 12d being sealed to the body portion 12d in the manner previously described for a preceding junction of cans.

The upper end 13 and the lower end 32 are drilled at or adjacent to the center thereof so as to provide, respectively, an intake port and a discharge port. The intake port is provided with an externally threaded length of tube or pipe which forms a nipple 33 while the lower intake port is provided with a similar externally threaded pipe, tube or nipple 34 which forms a discharge member. Nuts 35 and 36 are threadedly received on the nipple 33, on opposite sides of the bottom plate 13 so as to lock the nipple 33 in place, whereby a portion of the nipple 33 protrudes outwardly of the plate 13 and a portion thereof protrudes inwardly of plate 11. In like manner, nuts 37 and 38 sandwich the bottom plate 32 while being threadedly received on nipple 33 so that a portion of the nipple 33 protrudes outwardly of the plate 32 and a portion thereof protrudes inwardly.

It is now seen that the members 11, 11a, 11b, 11c, 11d and 11e form concentric juxtaposed abutting members which respectively define open communicating compartments 19, 19a, 19b, 19c, 19d and 19e respectively. Adjacent compartments are separated by radially extending baffles 14, 14a, 14b, 14c and 14d which are disposed spaced parallel relationship to each other and are provided with openings 15, 15a, 15b, 14c and 15d which are aligned with each other so as to provide spillways for the liquid which cascades down the respective compartments, being introduced into the solar collector element 10 through the nipple 33 so as to collect as a pool adjacent the first baffle 14. When the level of the pool has reached the opening 15, the liquid pours into the next compartment 19a where, when it reaches the level of the opening 15a, it pours into the next compartment to create a pool 40b and thence it pours through opening 15b to form a pool 40c in the next compartment 19c. Thereafter, the liquid pours through the opening 15c to create the pool 40d. This liquid then pours through opening 15d into compartment 19e to form the bottommost pool 40e which, when the level of the nipple 34 is reached, spills out of the nipple 34.

Figure 3:
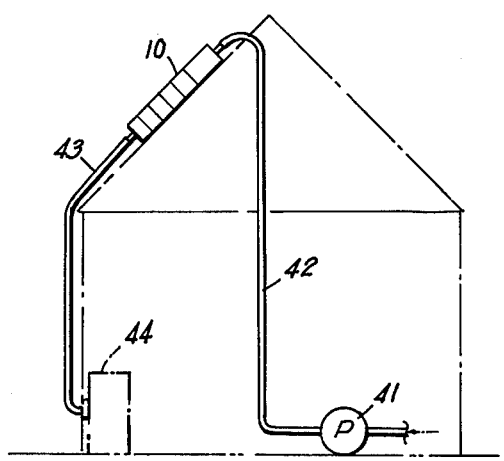
FIG. 3 is a diagrammatic view of the solar collector element of FIGS. 1 and 2 being disposed on the roof of a house and connected to a source of water for collecting the heat of the sun in the water.

As seen in FIG. 3, a pump 41 is suitable for supplying water through a supply pipe 42 to the nipple 33 of a solar collector element 10. A second or discharge pipe 43 connected to the nipple 34 supplies the heated water from the collector element 10 to a utility, such as a water heater 44. If the liquid has not been heated to the proper temperature, a thermostat can cut on auxiliary heating equipment to further heat the water prior to its being used. A series or plurality of collector elements 10 may be arranged side by side, parallel to each other, and connected to the pipes 42 and 43, if desired. Such elements 10 may also be arranged in series, if desired, to provide as long a solar collector element as desired.

Preferably, the surface of the solar collector element 10 is painted black so as to absorb the maximum rays of the sun. Of course, the collector element 10 may be painted any other color if desired and may be left unpainted if desired.

It will be readily understood that if desired, the tops of the beer cans, rather than the bottoms may be cut off and holes or openings cut or punched in the bottom thus, the bottoms of the cans form the radially disposed baffles 14a, 14b, 14c and 14d with differently shaped openings 15a, 15b, 15c and 15d.

Hence, the openings 15a, 15b, 15c and 15d may be centered or off-center, as desired. By rotating the collector element 10, the off-center holes 15, 15a, 15b, 15c, 15d can be adjusted to any angular position to vary the liquid levels, such as levels 40b, 40c, 40d, 40e, and thus vary the amount of liquid to be accumulated pool in each can.

Of course, while I have described liquid as a heat exchange liquid and use water as such liquid, the solar heat collector is operative using many different fluids, including air or other gases.

Preferably the nipples 33 and 34 and their nuts 35, 36, 37 and 38 should be of the same metal as the cans or they should be made of a non-metallic material, such as plastic, so as to reduce or eliminate electrolysis.

I claim:

1. A solar collection comprising, a plurality of metal soft drink or beer cans of the type which have body portions and tops across the ends of said body portions, the tops having openings therein formed when the cans were opened, each of said cans having an open bottom received by the top of the next adjacent can for forming a series of connected juxtaposed tandem coaxial cans defining successive compartments of a tubular body closed throughout its length and in which said tops of said cans form longitudinally spaced generally radially extending baffles which, when said tubular body is inclined with said openings being respectively spaced above the lowermost inside portions of the adjacent body portions, successive spillways for liquid fed by gravity from the uppermost can of said series and permit the liquid to collect in successive compartments while cascading down through said successive compartments.

2. The solar collector defined in claim 1 wherein the bottom end portions of said body portions respectively overlap the upper end portions of the body portions of the next adjacent cans.

3. The solar collector defined in claim 1 including an additional soft drink or beer can having a top in an opened condition and a body portion and a bottom, said additional can being connected to the open end of the endmost can at one end of said series.

4. The solar collector defined in claim 1 including an additional soft drink or beer can have a body portion and a bottom and in which the top has been removed, and the open upper portion of said additional can is connected to the top portion of the endmost can in said series.

5. The solar collector defined in claim 3 including a second additional soft drink or beer can having a body portion and a bottom and in which the top has been removed and the open upper portion of said said second additional can is connected to the top portion of the endmost can at the other end of said series.

6. The solar collector defined in claim 5 including nipples protruding through the bottom of each additional can.

7. The solar collector defined in claim 1 wherein said tops are provided with openings extending from the central portion outwardly toward an edge portion and wherein each of said openings is aligned in said series of cans.

* * * * *